UNITED STATES PATENT OFFICE.

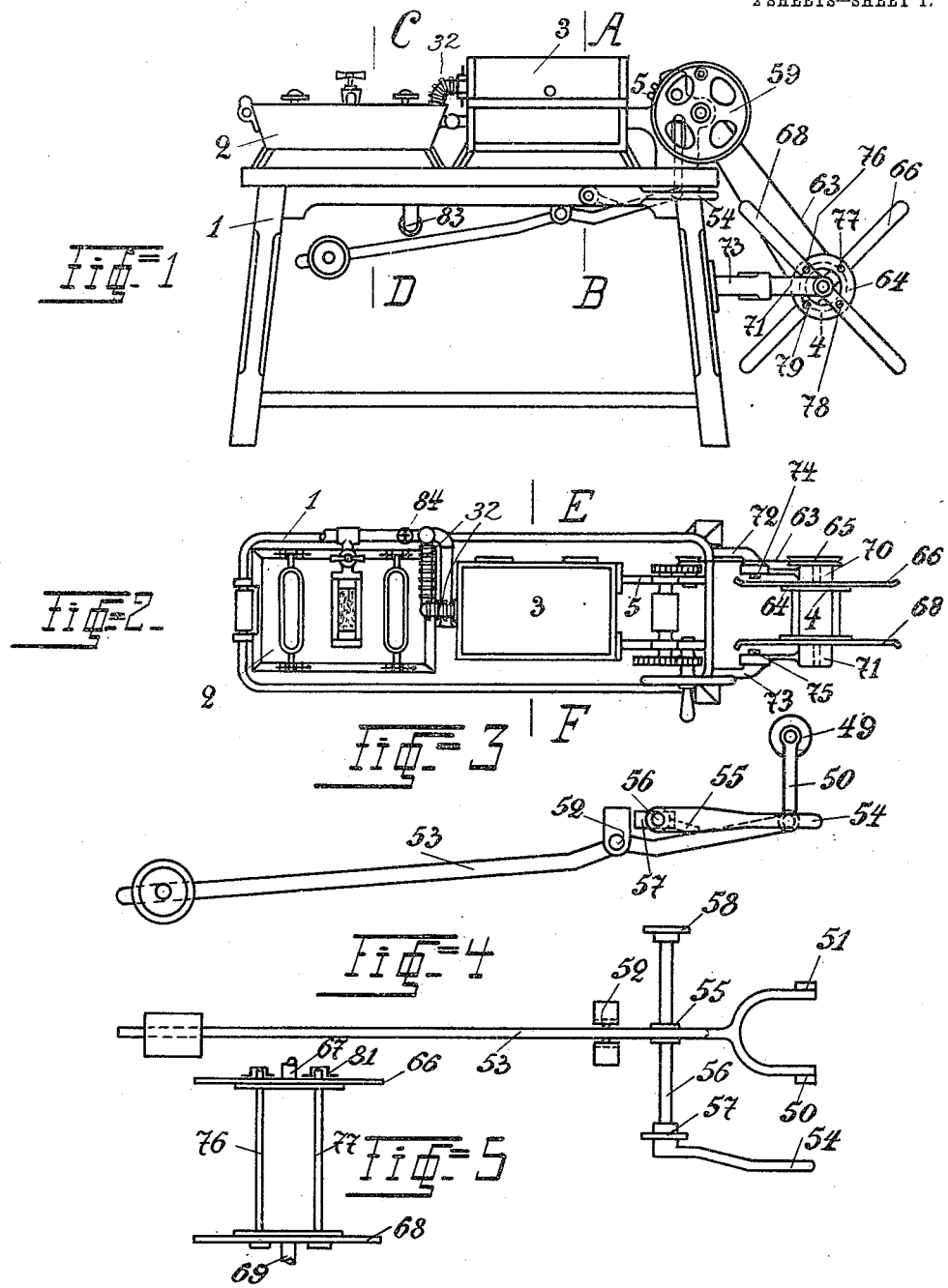

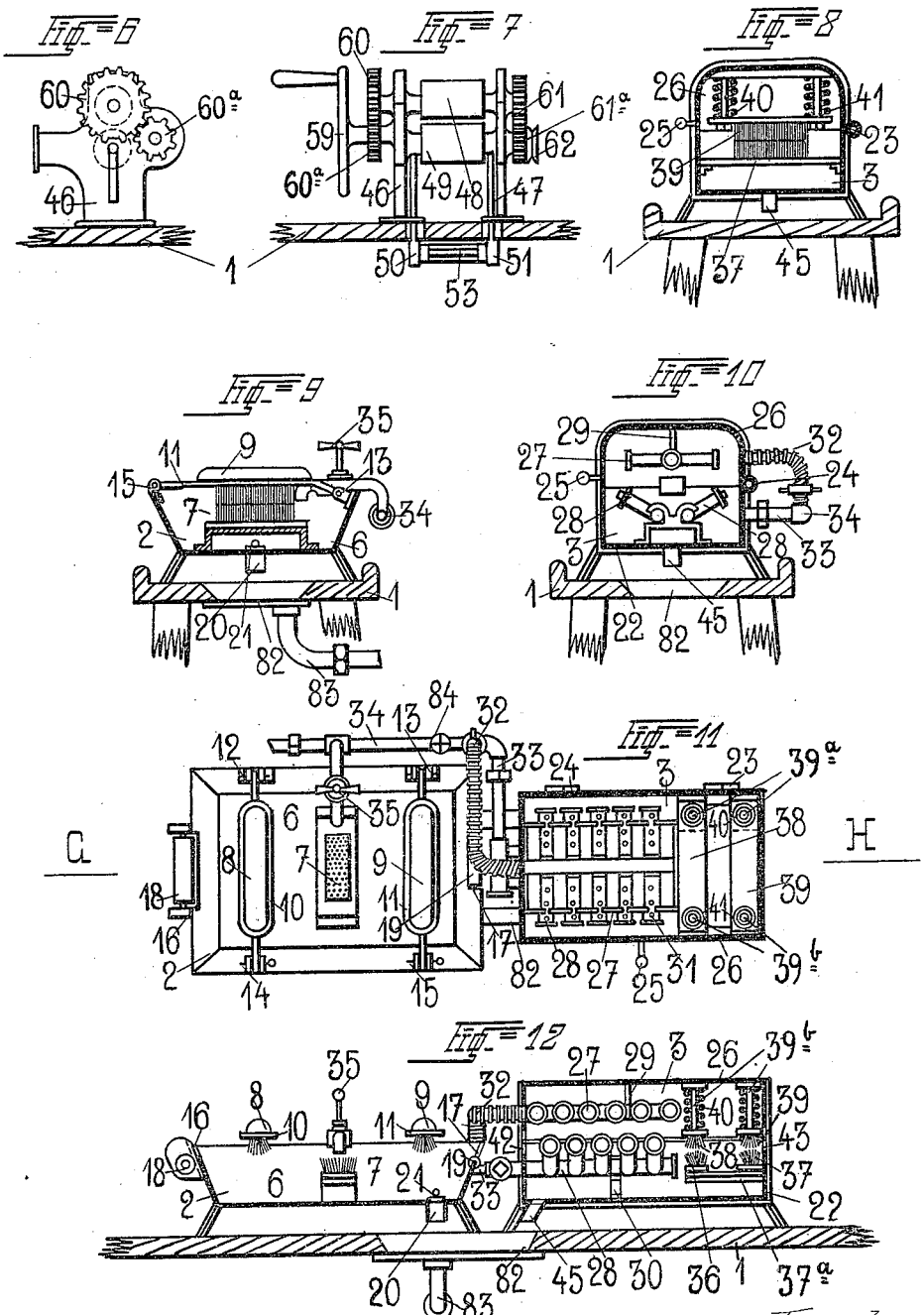

GEORG HOFMANN, OF KAUFBEUREN, GERMANY.

HOSE-CLEANING APPARATUS.

961,858.   Specification of Letters Patent.   Patented June 21, 1910.

Application filed March 6, 1909. Serial No. 481,654.

*To all whom it may concern:*

Be it known that I, GEORG HOFMANN, a subject of the German Emperor, residing at Kaufbeuren, in Germany, have invented certain new and useful Improvements in Hose-Cleaning Apparatus, of which the following is a specification.

The present invention relates to apparatus for cleaning hose, more particularly fire-engine hose.

One of its objects is to provide means for efficiently cleaning and squeezing a soiled hose without injury to the material and structure thereof, and another object is to provide apparatus which delivers the cleaned hose in a coiled state, so that it can be easily removed, for drying, without dragging it along the ground.

A construction embodying the invention is illustrated in the accompanying drawing, wherein—

Figure 1 is a side elevation of the whole apparatus, and Fig. 2 a plan view thereof. Fig. 3 is a side view of part of the hose squeezing and feed mechanism, and Fig. 4 a plan view thereof, with the squeezing cylinder removed. Fig. 5 is a plan view on a larger scale of the reel on which the hose is wound. Fig. 6 is a side view of the frame and part of the driving gear of the squeezing and feed mechanism, and Fig. 7 is a front elevation of the squeezing and feed cylinders with driving gear. Fig. 8 is a section on the line A—B of Fig. 1, through the spraying chamber, and Fig. 9 a section on the line C—D of Fig. 1, through the preliminary washing tank. Fig. 10 is a section on the line E—F of Fig. 2, through the spraying chamber, and Fig. 11 a plan view of the washing tank and spraying chamber, the latter being shown in section. Fig. 12 a section on the line G—H of Fig. 11.

The apparatus is mounted on a table 1 and comprises three principal parts, *i. e.* the preliminary washing tank 2, the spraying chamber 3 and the hose squeezing and feed mechanism 5, the latter acting in conjunction with a reel 4.

On the floor 6 of the tank 2 there is a brush 7 with upwardly directed bristles, and two brushes 8 and 9 with downwardly directed bristles are supported near the ends of the tank. The brushes 8 and 9 are carried by supports 10 and 11, and normally the tips of their bristles are in the same plane as the tips of the bristles of the brush 7.

The supports 10 and 11 are pivoted at 12 and 13, and their free ends can be fixed to the basin by means of pins 14 and 15.

The two shorter walls of the tank have recesses 16 and 17 for the passage of the hose. In front of the recess 16 outside the basin, there is a roller 18, and the lower edge of the recess 17 has a rounded sheath or guard 19. To the bottom of the tank is joined a short waste pipe 20 with plug 21.

The spraying chamber consists of a box 22 with a lid 26 hinged to it at 23 and 24 and provided with a handle 25. Two groups of nozzles 27 and 28 are arranged within this chamber, the nozzles 27 being carried by a hanger 29 fixed to the lid, and the nozzles 28 being supported by a frame 30 resting on the floor of the chamber. The nozzles 27 and 28 consist of short tubes with closed ends and perforations 31 in their walls. The hose travels between the nozzles 27 and 28 and the nozzles are so arranged and the orifices thereof are so formed that the jets therefrom will be directed onto the hose as it travels therebetween so that it will be thoroughly washed on all sides. Pipes 32 and 33 connect the nozzles 27 and 28 to the water main 34 which is also connected to a cock 35 with its orifice located above the tank 2. The pipe 32 is of rubber with flexible metal sheath. At the end of the chamber 3 remote from the tank 2 there are four brushes 36, 37, 38 and 39 arranged in pairs, the brushes 36 and 37 being fixed to a horizontal shelf 37ª and the brushes 38 and 39 being vertically slidable on hangers 39ª and 39ᵇ, on which they are thrust downward by springs 40 and 41, in order to compensate for wear at the tips of the bristles. The shorter end walls of the chamber 3 have apertures 42 and 43 for the passage of the hose, these apertures being formed partly in the walls of the box 22 and partly in the lid. The used water is discharged from the chamber at 45.

To the wall of the chamber 3, at the end remote from the tank are fixed the bearings 46 and 47 of the squeezing and feed mechanism 5. In these bearings are mounted rubber cylinders 48 and 49. The cylinder 49 is vertically movable and is connected by arms 50 and 51 to a weighted lever 53, fulcrumed at 52. This lever normally thrusts the lower cylinder 49 against the upper cylinder 48. For lowering the cylinder 49 the lever 53 is actuated by means of a hand lever 54, fixed to an axle 56, which has an arm 55 in contact with the weighted lever 53. The axle 56 is mounted in bearings 57 and 58 fixed to the table 1.

The squeezing and feed mechanism is operated by means of a hand wheel 59 geared to the axle of the cylinder 48 by means of toothed wheels 60 and 60ª. The axle of the cylinder 48 is geared to the reel 4 by means of gear wheels 61 and 61ª, pulley 62, belt 63 and pulley 65. Said pulley 65 and the reel-arms 66 are keyed to an axle 67, the reel arm 68 is keyed to an axle 69. The axles 67 and 69 have bearings in two arms 70 and 71, fixed to supports 72 and 73 by means of nuts 74 and 75, so that the reel can be adjusted to tension the belt. The hose is wound upon bars 76, 77, 78 and 79 made fast by means of nuts 80 and 81. The table 1 has a trough 82 and waste pipe 83 for the water discharged from the tank 2 and chamber 3.

For using the apparatus, the tank 2 is filled with water from the cock 35. The brushes 8 and 9 are lifted and the lid 26 is opened. The cylinder 49 is moved out of contact with the cylinder 48 by depressing the lever 54. One end of the hose to be cleaned, with the coupling device thereon is washed and brushed by hand in the tank 2, and the hose is then laid over the tank and box 22 and between the cylinders 48 and 49. The cylinder 49 is thereupon allowed to ascend again, to engage the hose; the lid 26 is closed and the brushes 8 and 9 are rotated into horizontal position, and locked by means of the pins 14 and 15. A valve 84 controlling the admission of water to the pipes 32 and 33 is thereupon opened and the wheel 59 is rotated by hand. The hose is by this means drawn through the tank and spraying chamber, cleaned by the brushes 7, 8, 9, 36, 37, 38 and 39 and by the jets of water from the nozzles 27 and 28, and squeezed by the cylinders 48 and 49. The front end of the hose is engaged with the reel, so that the hose is wound upon the reel. When the tail end of the hose has reached the tank 2 the feed action is stopped and brushes 8 and 9 are again lifted, so that the coupling device at the tail end can be cleaned by hand. The cylinder 49 is then lowered, and the tail end of the hose is wound upon the reel. For removing the coiled hose from the reel the bars 76, 77, 78 and 79 are unfastened and withdrawn from the reel. The coiled hose may then be carried to the drying tower, in order to be suspended therein. The apparatus may of course also be used for coiling a dry hose, in which case the tank is emptied and the valve 84 closed.

What I claim as my invention and desire to secure by Letters Patent of the United States is:—

1. Hose cleaning apparatus comprising in combination nozzles having their orifices directed toward a common axis, means for connecting said nozzles to a water main, hose squeezing cylinders beyond said nozzles, brushes between said cylinders and nozzles, a hose reel, and means for collectively rotating said cylinders and reel.

2. Hose cleaning apparatus comprising in combination a spraying chamber having a hinged lid and apertures for the entrance and exit of the hose, nozzles arranged in the lower part of said chamber, and having upwardly directed orifices, nozzles fixed to the inside of the lid and having downwardly directed orifices, means for collectively connecting said nozzles to a water main, an upwardly directed brush arranged in the lower part of said chamber, a downwardly directed brush fixed to the inside of the lid, hose squeezing cylinders, a hose reel, and means for collectively rotating said cylinders and reel.

3. Hose cleaning apparatus comprising in combination a water tank, brushes arranged to form a path for the hose in said tank, nozzles having their orifices directed toward a common axis in continuation of said path, means for connecting said nozzles to a water main, hose squeezing cylinders, brushes between said cylinders and nozzles, a hose reel, and means for collectively rotating said cylinders and reel.

4. Hose cleaning apparatus comprising in combination a water tank, a brush fixed in said tank, brushes hinged to the wall of said tank, means for fixing said hinged brushes in horizontal position so that they form with the first mentioned brush a path for the hose, nozzles having their orifices directed toward a common axis in continuation of said path, means for connecting said nozzles to a water main, hose squeezing cylinders, brushes between said cylinders and nozzles, a hose reel, and means for collectively rotating said cylinders and reel.

5. In a hose cleaning apparatus, a spraying chamber having a hinged lid and apertures for the entrance and exit of the hose nozzle arranged in the lower part of the spraying chamber and provided with upwardly directed orifices, nozzles supported by the hinged lid of the chamber and provided with downwardly directed orifices, a water supply pipe, a connection between the water supply pipe and the nozzles in the lower part of the chamber, and a flexible connection between the water supply pipe and the nozzles in the hinged lid of the chamber.

In witness whereof I have signed this specification in the presence of two witnesses.

GEORG HOFMANN.

Witnesses:
 LOUIS I. MUELLER,
 MATHILDE K. HELD.